Feb. 12, 1929. 1,701,678
M. JAEGER
METHOD OF AND APPARATUS FOR DIGGING UP GROUND FROM BELOW THE SURFACE
Filed April 26, 1928 2 Sheets-Sheet 1
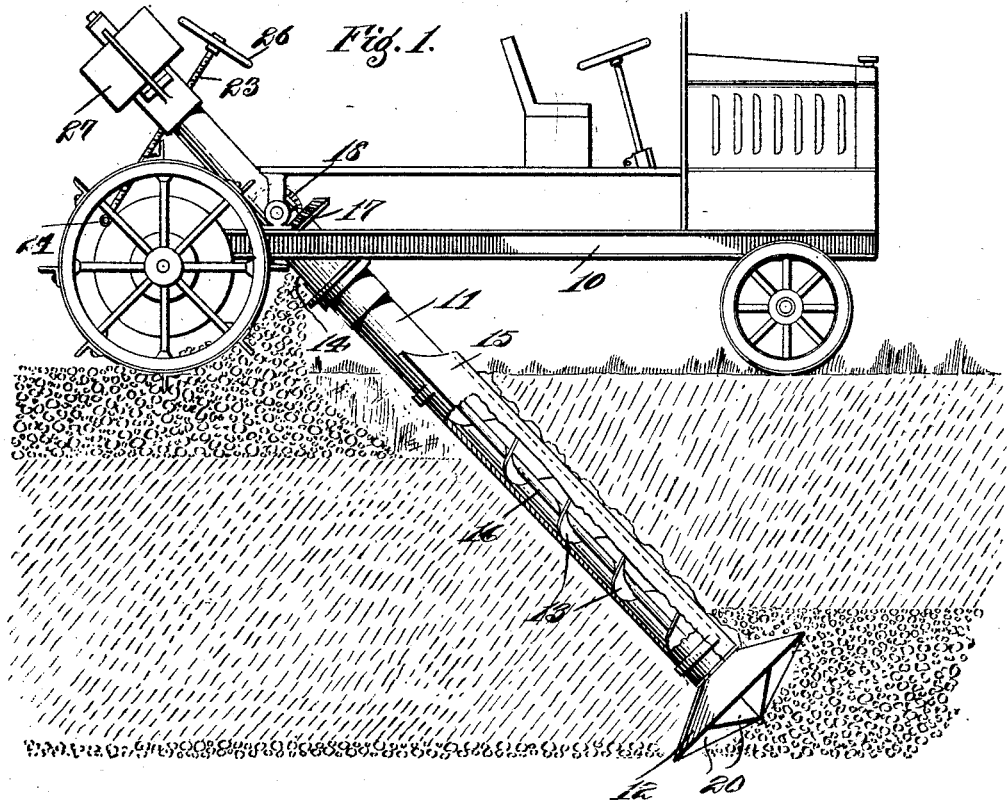
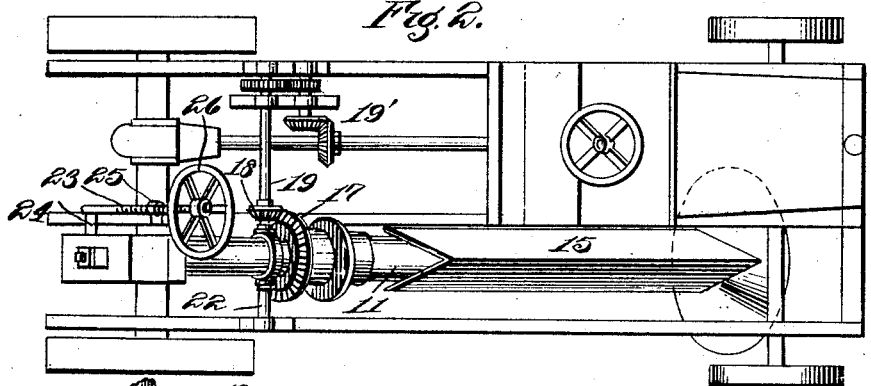
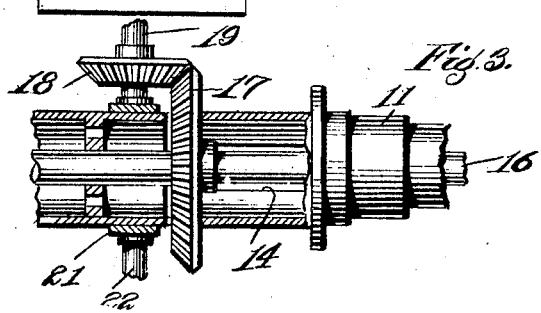
INVENTOR
Max Jaeger.
BY
ATTORNEY Feb. 12, 1929. 1,701,678
M. JAEGER
METHOD OF AND APPARATUS FOR DIGGING UP GROUND FROM BELOW THE SURFACE
Filed April 26, 1928   2 Sheets-Sheet 2
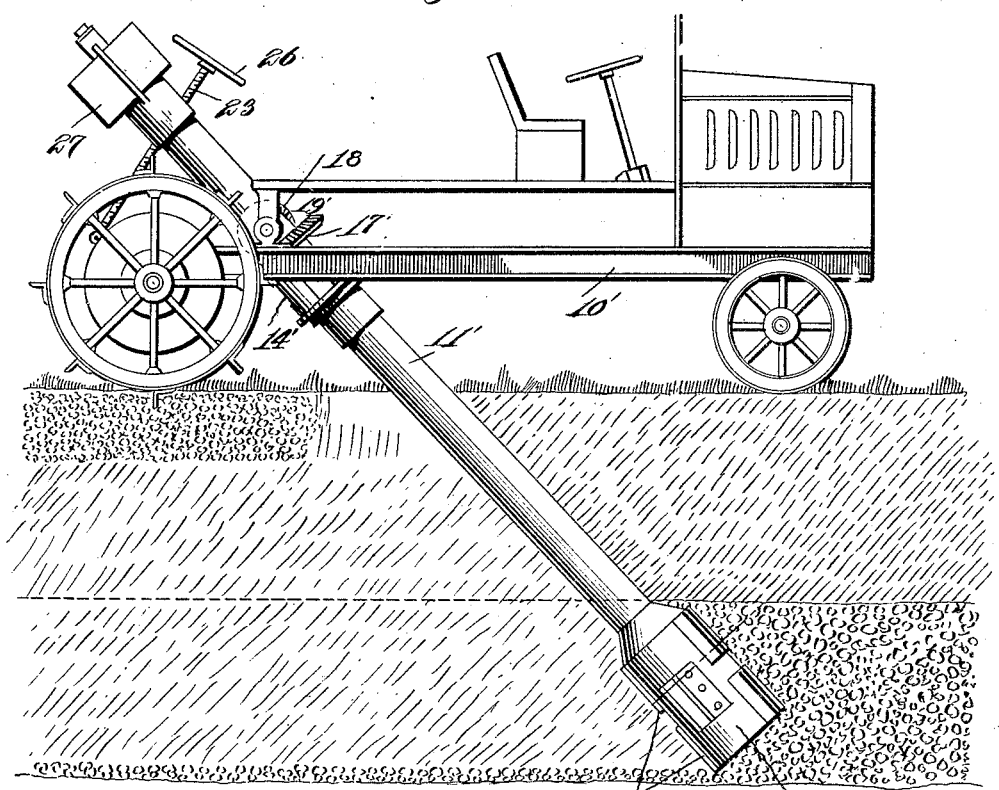
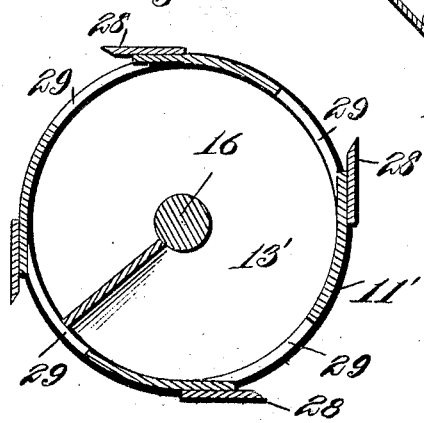
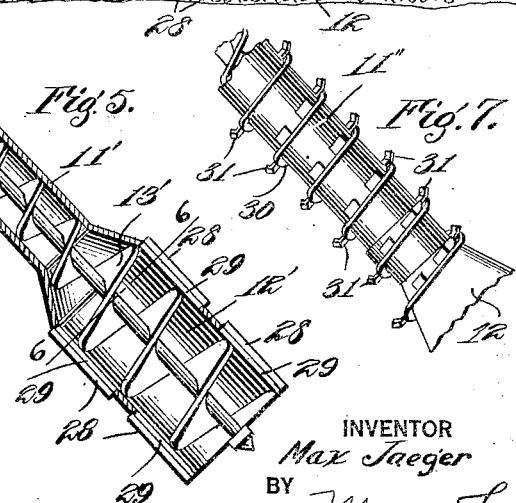
INVENTOR
Max Jaeger
BY
ATTORNEY Patented Feb. 12, 1929.

1,701,678

UNITED STATES PATENT OFFICE.

MAX JAEGER, OF WESSELBUREN, GERMANY, ASSIGNOR TO HEDWIG OLGA SUSETTE KRÜGER.

METHOD OF AND APPARATUS FOR DIGGING UP GROUND FROM BELOW THE SURFACE.

Application filed April 26, 1928, Serial No. 273,123, and in Germany November 22, 1927.

My invention relates to a method of and apparatus for digging sub-soil or ground from below the surface without removing the surface layer or top soil.

It is an object of my invention to save labour for digging and conveying, and to this end I provide a conveyer preferably of tubular form and means therein for raising the layer to be dug up and for discharging it through the tube.

In a preferred embodiment of my invention I provide a truck or other vehicle on which the conveyer is supported and which may be adapted to be moved along the ground like a plow by a tractor or by power derived from its own prime mover.

My invention is applicable with particular advantage to the digging up of a sub-stratum of sand, or other earth, containing a large percentage of lime, such as are found in alluvial ground. Such sand or earth when raised to the surface may serve as a fertilizer, being spread on the ground in situ.

The conveyer may be provided with a cutter in order to enable it to break the soil after the manner of a plough. In very soft ground and in moors with a comparatively thin solid surface layer the cutter can be dispensed with. In harder ground and more particularly in marshes to which my invention is applicable with particular advantage, a cutter resembling a plough share which is secured to or moved in advance of the conveyer or a rotary conveyer tube equipped with cutting blades may be provided.

I am aware that it has already been suggested to use tubes enclosing helical conveying means, but such conveyers have only been used for conveying material above ground.

With the foregoing and other equally important objects and advantages in view, the invention resides in the certain new and useful combinations, constructions and arrangements of parts as will be hereinafter more fully described, set forth in the appended claims, and illustrated in the accompanying drawings, in which:

Figure 1 is a side elevation, partly in section, of one form of the invention,

Figure 2 is a top plan view of the same,

Figure 3 is an enlarged fragmentary sectional detail of the trunnioned mounting on the chassis of the vehicle for the soil working implement or device, Figure 4 is a view similar to that of Figure 1, but shows a modified form of the soil working implement or device as it appears when operatively mouned on a vehicle, Figure 5 is an enlarged fragmentary sectional detail of a modified form of the implement or device per se, Figure 6 is a sectional view taken on the line 6—6 of Figure 5, and Figure 7 is a view similar to that of Figure 6, but showing a further modified form of the implement or device per se.

Referring to the drawings, wherein like characters of reference designate corresponding parts throughout the several views thereof, and more particularly to Figures 1, 2 and 3, the embodiment of the invention, as shown therein by way of example, comprises a truck or other vehicle 10, on which is mounted a combined trenching and sub-soil implement or device 11, the latter being supported on the vehicle in such a manner that its inclination to the horizontal can be varied at will by the operator. The implement or device 11 is preferably in the form of an elongated tubular body having an enlarged excavating portion or head 12 at its lower end. A conveyer helix or worm 13 is housed within the body or tube 11 to elevate the excavated sub-soil from the head 12 upwardly through the body or tube, and functions to discharge the soil outwardly of the opening or openings 14 formed in the upper end portion of the latter for the purpose.

A cutter 15, somewhat resembling a plough share, is preferably secured in position at the leading side of the body or tube 11 to trench the stratum or strata of soil above the stratum of sub-soil to be excavated and conveyed upwardly for discharge onto the surface of the upper stratum of soil, which falls back into the trench as the implement progresses in a forward direction of movement of the vehicle.

In this instance of the invention, the excavating member or head 12 is fixed to the lower end of a shaft 16 extending axially upward through the body or tube 12 for rotation therewith, when power is applied to the shaft through the intermeshing gears 17 and 18. The vehicle 10 may have a single power plant (not shown) for propelling the same and for operating the working parts of the implement 11, or it may have separate power plants (not shown) for operating the vehicle and the implement, one independently of the other, as may be necessary or desired. The gear 17 is keyed or otherwise secured to the upper end portion of the shaft 16, and the gear 18 to a countershaft or the like 19, which is journaled transversely of the chassis of the vehicle 10, and the power is preferably applied to the latter shaft through a reducing gearing 19', substantially as shown. A series of radially disposed cutters 20 are arranged within the lower open end of the excavator member or head 12 to effect a thorough dislodgment and breaking up of the stratum of sub-soil to be removed and elevated for discharge onto the ground surface.

As a means for supporting the implement in position on the vehicle body, the tubular body 11, above the gear 17, will be engaged through a bearing collar 21, which will have bossed sockets projecting from its opposite sides for engagement on the transversely alined trunnions 22, one of the trunnions being constituted, preferably in the adjacent end of the countershaft 19, so that the veritcal swinging adjustment of the implement will have the latter as its center, and the gear 17 will remain in mesh with the gear 18 at all times. The adjustment of the inclination of the implement 11 with respect to the horizontal may be accomplished in any suitable manner, or through the medium of an adjusting screw 23, which is pivoted at its lower end, as at 24, to a desired point on the chassis of the vehicle 10, and which is engaged through a swivel or the like 25 mounted at one side of the upper end portion of the tubular body 11. A hand wheel or the like 26 is secured on the upper end of the adjusting screw 23 to facilitate the operation thereof. A counterbalance device or weight 27 is preferably attached to the extreme upper end of the tubular body 11, in any suitable manner to aid in the proper adjustment of the implement.

In the operation of this form of the machine, as the vehicle is propelled along the ground and at the same time the shaft 16, the helix or worm 13 and the cutter head 12 are rotated, the ground from the layer or stratum to which the cutter head 12 has been lowered, is dug up, raised and dropped through the opening or openings 14, while the upper layer or stratum is broken up by the stationary cutter 15, and is passed rearwardly of the same and deposited back into the trench, thus opened up by the implement in its entirety, and in a manner that the lower stratum of earth or sub-soil is discharged on top of the same.

Referring now to Figs. 4 to 6, inclusive, the vehicle 10', the reduction gear 19' and the implement 11' are generally designed as described with reference to Figs. 1, 2 and 3, but the tubular body of the implement 11' is here arranged for rotation about its axis and is provided with cutting blades 28 as shown. In this instance of the invention, the bottom end of the tubular body 11' is also of greater diameter than its top end and this enlarged portion forms the excavator head of the implement. The worm 13 extends throughout the tubular body below the discharge outlet 14 and rotates therein to convey the loosened soil to the surface of the ground. This enlarged portion or head 12' is preferably provided with a plurality of longitudinally extending slots 29 for the passage inwardly thereof of the ground which is dug up by the blades 28 upon rotation of the body 11', the ground being engaged by the helix or worm 13', raised and discharged at the opening or openings $g$, as will appear from Fig. 6. The edges of the blades 28 project some distance beyond the trailing edges of the slots 29, which edges are preferably bent tangentially at these points in order to facilitate the securing of the blades 28 and also the proper cutting operation of the same.

In order to prevent clogging of the tubular body 11' by the ground which is raised by the enlarged bottom end of the worm, the worm in the smaller portion of the body preferably has a larger pitch than the lower end portion thereof.

Obviously cutter blades may be provided throughout the active working length of the tubular body 11', that is in the smaller portion as well as in the larger portion of the tubular body 11', and such arrangement is preferably provided for use in very hard ground to facilitate the forward movement of the machine.

Referring now to Figure 7, which shows a further modified form of the soil working implement or device 11'', a helical cutting element 30 may be encircled about the tubular body of the implement and extended upwardly from the adjacent inner or upper end of the excavator head 12''. Also, this helical cutting element 30 may have upstanding angular portions 31 formed at intervals along the outer edge of the same as a further aid in cutting through hard ground, and to cause the detached soil to be passed rearwardly from the implement or device.

I wish it to be understood that I do not desire to be limited to the exact details of construction shown and described for obvious modifications will occur to a person skilled in the art.

I claim:—

1. A machine for digging up ground from below its surface comprising a conveyor tube, a cutter arranged adjacent the end of the conveyor tube and adapted to loosen the soil at a point spaced from the surface of the ground, means in said tube for conveying the loosened soil to the surface of the ground, and cutting means arranged on the conveyor tube and adapted to move the soil from in front of the tube to the rear thereof without materially displacing it longitudinally of the tube.

2. A machine for digging up soil from below its surface comprising a rotating conveyor tube, a conveyor arranged within said tube, cutters arranged about the lower periphery of the tube, said tube having openings therein arranged adjacent the cutters whereby rotation of the tube moves the cutters to loosen the soil, which loosened soil passes through the openings in the rotating tube and is delivered to the conveyor within the tube.

3. A machine for digging up ground from below its surface comprising a rotating conveyor tube, a conveyor in said tube, said tube having a series of openings in its periphery adjacent the lower end thereof, and cutters arranged tangentially of the tube adjacent the openings in the lower end thereof, whereby rotation of the conveyor tube moves the cutters attached thereto to loosen the soil, the loosened soil passing through the openings in the tube to the conveyor within the tube.

4. A machine for digging up ground from below its surface comprising a rotating conveyor tube, said tube having an enlarged lower end, a conveyor screw arranged in said tube, said conveyor screw having an enlarged lower end conforming to the shape of the enlarged lower end of the tube, the enlarged lower end of the conveyor screw having less pitch than the body of the screw, and cutters arranged on the periphery of the enlarged portion of the tube and extending beyond the periphery of the tube, said tube being provided with openings arranged adjacent the cutter whereby the rotation of the tube and associated cutters will loosen the soil, said loosened soil passing through the openings to the conveyor within the tube.

5. A machine for digging up ground from below its surface comprising a rotating conveyor tube, a cutter element secured to the end of the conveyor tube and communicating with the interior of the conveyor tube, said cutting member being adapted to loosen soil at a point spaced from the surface of the ground, a conveyor within said tube and adapted to convey the loosened soil to the surface of the ground, and a cutting element arranged on the outer periphery of the tube and extending from a point adjacent the first mentioned cutting member to the surface of the ground, said cutting element rotating with the tube to move the soil from in front of the tube to the rear thereof without materially displacing it longitudinally of the conveyor tube.

6. A machine for digging up ground from below its surface comprising a rotating conveyor tube, a cutter secured to the end of the tube and communicating with the interior thereof, said cutter being adapted to loosen soil at a point spaced from the surface of the ground, a conveyor within said tube adapted to convey the loosened soil to the surface of the ground, and a helical cutting element encircling said tube and extending from a point adjacent the first mentioned cutter to the surface of the ground, said helical cutting element rotating with the conveyor tube to loosen soil ahead of said conveyor tube and move it to the rear of said tube without materially displacing it longitudinally of the tube.

7. A machine for digging up ground from below its surface comprising a rotating conveyor tube having an enlarged lower end, a conveyor screw in said tube, cutters arranged on the periphery of the enlarged end of the tube and extending beyond the periphery of the tube, said tube being provided with openings arranged adjacent the cutters, and a helical cutting element encircling the conveyor tube and extending from the enlarged lower end of the tube to the surface of the ground, whereby upon rotation of the conveyor tube the lower strata of soil are loosened by the first mentioned cutters and pass through the openings in the enlarged portion of the tube to the conveyor, and whereby the helical cutter rotating with the conveyor tube loosens the upper strata of soil in front of the tube and moves them to the rear thereof without materially displacing them longitudinally of the tube.

8. A machine for digging up ground from below its surface comprising a rotating conveyor tube, a cutter secured to the end of the tube and communicating with the interior thereof, said cutter being adapted to loosen soil at a point spaced from the surface of the ground, a conveyor within said tube adapted to convey the loosened soil to the surface of the ground, and a helical cutting element encircling said tube and extending from a point adjacent the first mentioned cutter to the surface of the ground, said helical cutting element being interrupted by spaced openings and rotating with the conveyor tube to loosen soil ahead of said conveyor tube and move it to the rear of said tube without materially displacing it longitudinally of the tube.

9. The method of removing ground from below its surface comprising moving a tube through the ground, loosening the soil adjacent the lower end of the tube and passing it through the tube to the surface of the ground, and moving the soil from immediately in front of the tube through a substantially horizontal plane to a point behind the tube to allow the tube to move through the ground without disturbing the relative positions of the strata of soil above the stratum to be removed.

In testimony whereof I affix my signature.

MAX JAEGER.